(No Model.) 3 Sheets—Sheet 1.

E. H. WHEELER.
MACHINE FOR CUTTING SCRAP METAL.

No. 490,054. Patented Jan. 17, 1893.

WITNESSES
H. A. Lauls
Pearl M. Reynolds

INVENTOR
Edward H. Wheeler
By A. M. Wooster
Atty.

(No Model.) 3 Sheets—Sheet 2.
E. H. WHEELER.
MACHINE FOR CUTTING SCRAP METAL.

No. 490,054. Patented Jan. 17, 1893.

WITNESSES
H. A. Lamb
Pearl M. Reynolds.

INVENTOR
Edward H. Wheeler
By A. M. Wooster
Atty.

(No Model.) 3 Sheets—Sheet 3.
E. H. WHEELER.
MACHINE FOR CUTTING SCRAP METAL.
No. 490,054. Patented Jan. 17, 1893.
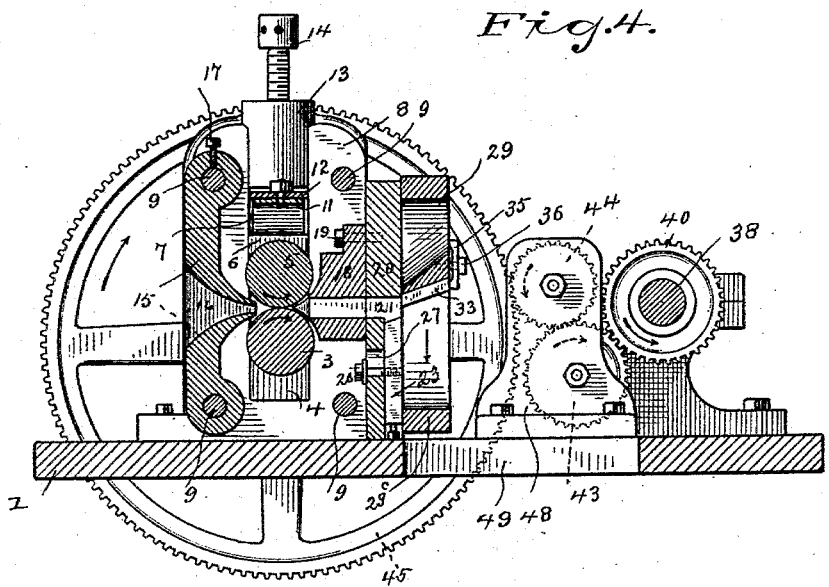
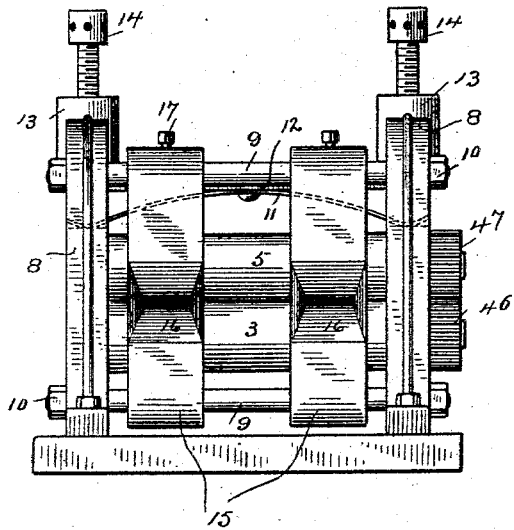
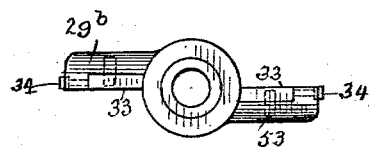
WITNESSES
H. A. Lamb
Pearl M. Reynolds
INVENTOR
Edward H. Wheeler
By A. M. Wooster
Atty.

UNITED STATES PATENT OFFICE.

EDWARD H. WHEELER, OF WATERBURY, CONNECTICUT, ASSIGNOR TO THE WATERBURY BRASS COMPANY, OF SAME PLACE.

MACHINE FOR CUTTING SCRAP METAL.

SPECIFICATION forming part of Letters Patent No. 490,054, dated January 17, 1893.

Application filed August 17, 1892. Serial No. 443,305. (No model.)

*To all whom it may concern:*

Be it known that I, EDWARD H. WHEELER, a citizen of the United States, residing at Waterbury, in the county of New Haven and State of Connecticut, have invented certain new and useful Improvements in Machines for Cutting Scrap Metal; and I do hereby declare the following to be a full, clear, and exact description of the invention, such as will enable others skilled in the art to which it appertains to make and use the same.

Figure 1:
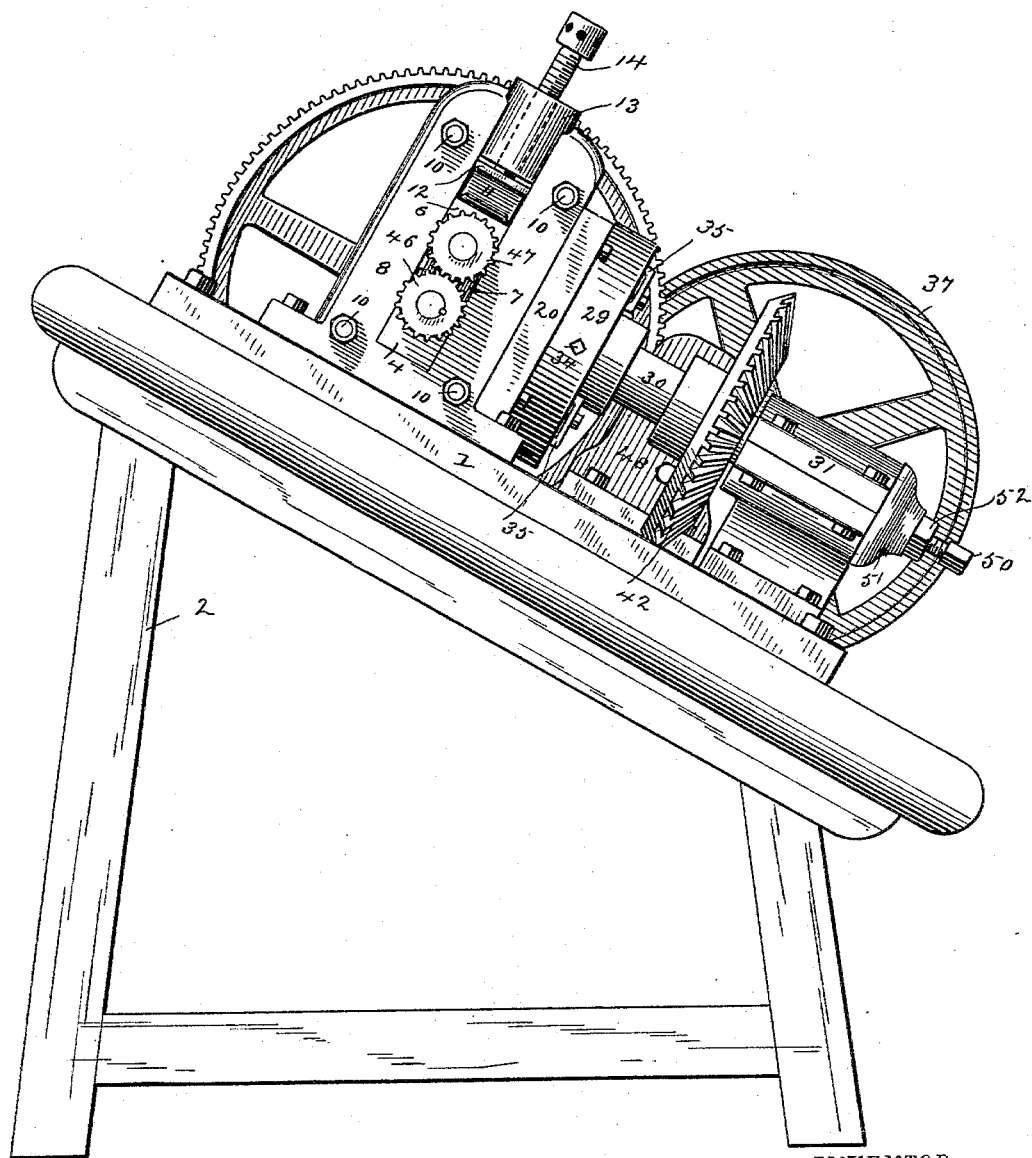
Figure 2:
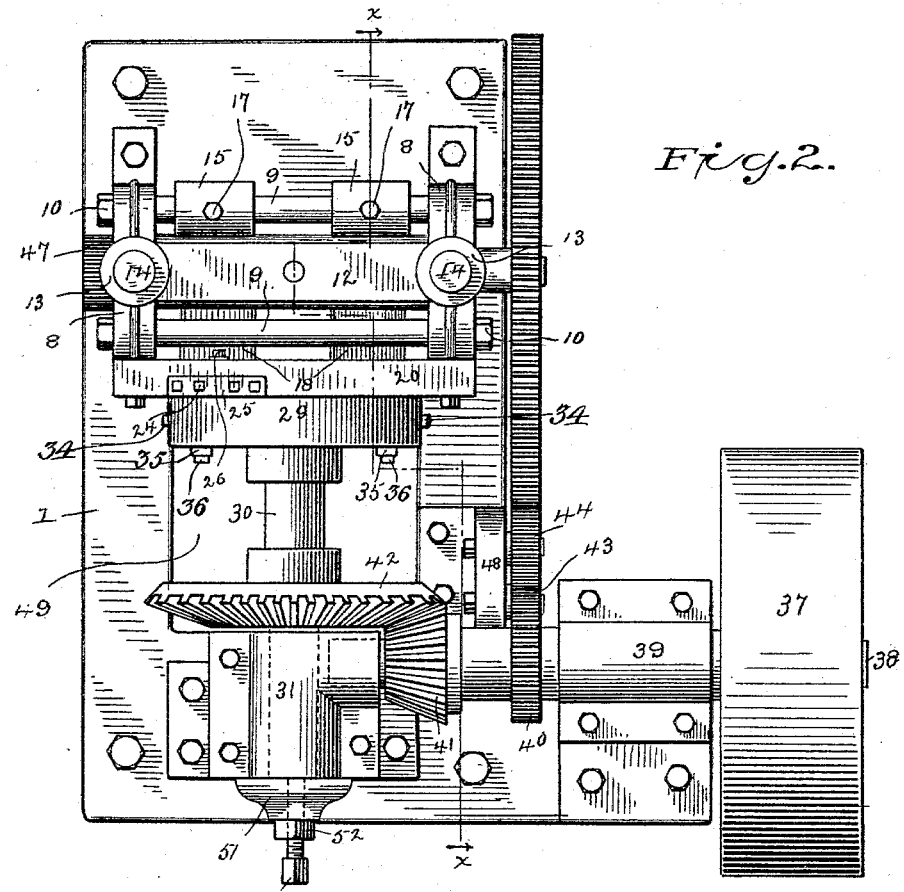
Figure 5:
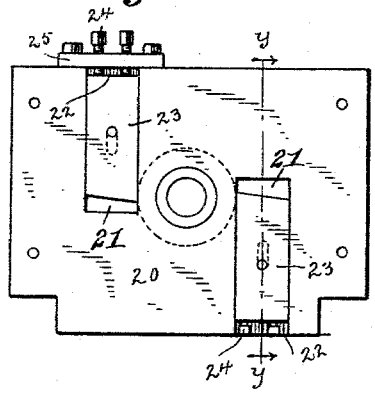
Figures 6, 7:
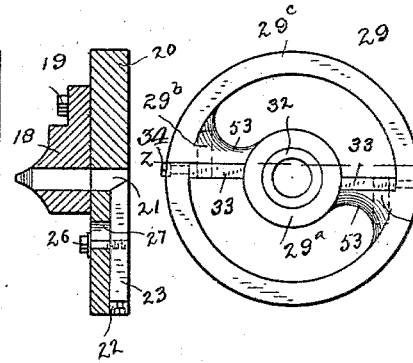
Figure 8:
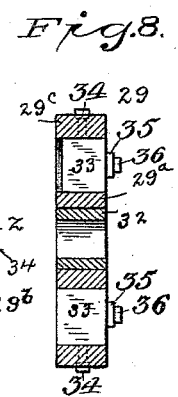

My invention has for its object to simplify and improve the construction of machines for cutting sheet metal scrap. With this end in view I have devised the novel machine which I will now describe referring by numbers to the accompanying drawings forming part of this specification in which:

Figure 1 is a side elevation of the machine complete. Fig. 2 a plan view. Fig. 3 a front elevation. Fig. 4 a section on the line $x\,x$ in Fig. 2. Fig. 5 an elevation of the cutter plate detached. Fig. 6 a section of the cutter plate on the line $y\,y$ in Fig. 5. Fig. 7 a front elevation of the rotary cutter head. Fig. 8 a section of the cutter head on the line $z\,z$ in Fig. 7, and Fig. 9 is a view corresponding with Fig. 7 illustrating a modified form of cutter head.

1 denotes the bed of the machine which is supported by a suitable framework 2 and is preferably placed at an incline as shown in Fig. 1 so that the scrap will be fed to the cutters by gravity after the pieces have passed the feed rolls, this being an important feature when short pieces of scrap are being fed to the machine.

3 denotes the lower feed roll which is journaled in a box 4, and 5 the upper feed roll journaled in a box 6. These boxes lie in slots 7 in heavy side plates 8 which are bolted to the bed, said side plates being braced and rigidly supported by cross bars 9 the ends of which are threaded and are engaged by nuts 10 bearing against the side plates. The boxes carrying the lower feed roll rest on the bottoms of the slots. The upper feed roll rests upon the lower feed roll and is held down in use by a strong spring 11 carried by a cross bar 12.

13 denotes blocks at the tops of the side plates and 14 screws which pass through said blocks and engage cross bar 12 to regulate the pressure of the spring upon the upper feed roll.

The scrap to be cut is fed to the machine through two guides 15 having beveled openings 16 through which the scrap is passed. The upper and lower cross bars at the front of the machine pass through these guides which are locked in position by set screws 17. After leaving the feed rolls the scrap passes through guides 18 which are secured by bolts 19 to the cutter plate 20, said cutter plate being itself bolted to the rear ends of the side plates as clearly shown.

The cutter plate is provided with two openings 21 through it which register with guides 18, and with recesses 22 to receive cutters 23. These cutters are adjustable vertically by means of adjusting screws, 24, the screws for the upper cutter passing through a plate, 25, bolted to the cutter plate, and the screws for the lower cutter resting against the bed. The cutters are held in the recesses by means of bolts 26 which pass through slots 27 in the cutter plate and engage the cutters themselves.

Operating in connection with cutters 23 is a pair of cutters 33 carried by a cutter head 29, which rotates in the plane of cutters 23 and the cutter plate and in close contact therewith. This cutter head is fixed at the inner end of a longitudinal shaft 30 journaled in a box 31 the base of which is bolted to the bed. The cutter head as illustrated in Figs. 1, 2, 4, 7 and 8 consists of a hub $29^a$ engaging a sleeve 32 secured to the shaft, arms $29^b$ extending from the hub and a rim $29^c$, the latter giving additional strength to the cutter head. In the form illustrated in Fig. 9 the rim is dispensed with. The cutters are secured in arms $29^b$ by means of set screws 34 which bear against their outer edges and plates 35 which engage the rear ends thereof, the plates themselves being held in place by screws 36 engaging the arms. It will be noticed, see Figs. 7 and 9, that the backs of arms $29^b$ incline backward and inward from their fronts where the cutters are attached, as at 53, on the side toward cutters 23. This is in order to insure that as the scrap is fed forward, after a piece has been severed by a pair of cutters, it will not come in contact with the arm and be buckled or doubled thereby, but the end of the scrap will pass over the incline and between the arms.

Power is applied to drive the machine by means of a belt not shown running over a belt pulley 37 on a shaft 38 journaled in a box 39 the base of which is bolted to the bed, and in box 31. At the inner end of shaft 38 is a pinion 40 and a bevel pinion 41. The bevel pinion meshes with a bevel gear 42 on shaft 30 which carries the cutter head. Pinion 40 engages an idler pinion 43 which in turn engages a pinion 44 the latter engaging a gear wheel 45 at one end of the lower feed roll. At the opposite end of the lower feed roll is a pinion 46 which engages a corresponding pinion 47 on the upper feed roll. Pinions 43 and 44 are carried by a bracket 48 the base of which is bolted to the bed. It will thus be seen that positive motion is imparted to the feed rolls and to the cutter head. Shaft 30 and the cutter head are adjusted inward by a set screw 50 which passes through a plate 51 secured to box 31. A set nut 52 bears against the plate and locks the set screw in position after adjustment. The action of this set screw is to hold the cutter-head close up against the cutter plate and cutters 23, so as to prevent lost motion and insure a quick shearing cut.

The operation is as follows: The scrap to be cut is fed into guides 15, passes through the feed rolls then through guides 18 and through openings 21 in the cutter plate. The bed being preferably placed at an angle as before stated causes short pieces of scrap to feed forward by gravity after passing the feed rolls. Cutters 23 require to be suitably adjusted in cutter plate 20 and cutters 33 to be suitably adjusted in rotating cutter head 29. The cutters having been once adjusted do not require to be changed until they become worn or dulled from long continued use. It will be seen that the action of one of the cutters in the rotary cutter head is downward and the action of the other cutter in the rotary cutter head is upward, each of these cutters acting in connection with one of the stationary cutters in the cutter plate, the action in each instance being a shearing cut instead of a chopping cut so that the scrap is cut in the easiest manner possible, as rapidly as may be desired and with the least possible strain upon the machine or wear upon the cutters. The pieces of cut scrap drop down through an opening 49 in the bed of the machine upon the floor or into a suitable receptacle, not shown, placed under the bed.

Having thus described my invention I claim:

1. In combination, the rotary cutter head having laterally arranged knives, the shaft carrying said head, the stationary perforated plate in which the shaft is journaled having a recess and a knife countersunk therein and adjustable toward and from the perforation in the plate, the said cutter head knives being adjustable laterally of the cutter head and toward and from the rear face of the perforated plate with its countersunk knife, substantially as described.

2. In combination, the bed plate, the side plates with means for holding the same in place, the stationary knife plate secured at the rear of the side plates and having a perforation and a knife on its rear side, the cutter head shaft journaled in said plate and extending from the rear side thereof, the cutter on said shaft having knives working on the rear side of the plate and the guiding means between the side plates and at the front of the stationary knife plate, substantially as described.

3. In combination, the side plates, the bed supporting the same, the stationary knife plate having a perforation and arranged at the rear of the side plates, the cutter head and shaft at the rear of the stationary knife plate and the guiding means consisting of the plate and the cross bars for holding the same and connecting the side plates together, substantially as described.

4. In combination, the stationary knife plate, having a shaft bearing in its center having openings extending through it on opposite sides of its central bearing, through which to project the substance to be cut the knives countersunk in the rear face of the plate and extending in opposite directions their cutting edges projecting to said openings with means for adjusting them, and the rotary cutter head having its shaft bearing in the central opening and its cutting knife working on the knives in the rear face of the stationary plate, substantially as described.

5. The combination with the feed rolls and cutters 23, of a cutter head rotating in the plane of said cutters and having arms $29^b$, and cutters 33 carried by said arms, the backs of said arms being inclined backward and inward on the side toward cutters 23 so as to prevent the scrap from clogging as it is fed forward after a piece has been severed.

In testimony whereof I affix my signature in presence of two witnesses.

EDWARD H. WHEELER.

Witnesses:
E. D. STEELE,
J. S. ELTON.